(12) United States Patent
DeJesus

(10) Patent No.: US 12,446,560 B2
(45) Date of Patent: Oct. 21, 2025

(54) ANIMATED FISHING JIG APPARATUS AND SYSTEM

(71) Applicant: Edward DeJesus, North Palm Beach, FL (US)

(72) Inventor: Edward DeJesus, North Palm Beach, FL (US)

( * ) Notice: Subject to any disclaimer, the term of this patent is extended or adjusted under 35 U.S.C. 154(b) by 0 days.

(21) Appl. No.: 18/905,098

(22) Filed: Oct. 2, 2024

(65) Prior Publication Data

US 2025/0107514 A1    Apr. 3, 2025

Related U.S. Application Data

(60) Provisional application No. 63/542,088, filed on Oct. 2, 2023.

(51) Int. Cl.
*A01K 85/01*    (2006.01)
*A01K 85/00*    (2006.01)
*A01K 85/16*    (2006.01)

(52) U.S. Cl.
CPC ............ *A01K 85/015* (2022.02); *A01K 85/16* (2013.01); *A01K 85/1893* (2022.02); *A01K 85/1897* (2022.02)

(58) Field of Classification Search
CPC ... A01K 85/015; A01K 85/01; A01K 85/1833
See application file for complete search history.

(56) References Cited

U.S. PATENT DOCUMENTS

| | | | | |
|---|---|---|---|---|
| 4,823,497 A | * | 4/1989 | Pierce | A01K 85/01 43/44.99 |
| 6,108,960 A | * | 8/2000 | Sylla | A01K 85/01 43/17.6 |
| 2014/0115944 A1 | * | 5/2014 | Thomas | A01K 85/01 43/4.5 |
| 2017/0071177 A1 | * | 3/2017 | Mann | H02J 7/0044 |

(Continued)

FOREIGN PATENT DOCUMENTS

| | | | |
|---|---|---|---|
| CA | 3160374 A1 | * | 10/2023 |
| CN | 208273923 U | * | 12/2018 |

(Continued)

*Primary Examiner* — Christopher P Ellis
(74) *Attorney, Agent, or Firm* — William A. Harding; Grable Martin PLLC

(57) ABSTRACT

An animated fishing jig apparatus with a molded jig body (e.g., torpedo shape, substantially round cross section) having an eyeball window(s) on its exterior surface and an interior chamber configured to fittedly carry an animator system assembly comprising a light source(s) (e.g., LED, multicolor, flashing), a micro vibration motor, and a battery. A head eye and a tail eye are mechanically connected to forward and aft portions of the jig body, respectively. The clear (or opaque) eyeball windows allow light source(s) emissions to escape into the nearby environment. The battery (e.g., rechargeable, removeable, or permanent) powers the light source(s) and the micro vibration motor during use. An automatic switch (e.g., water sensor type or pressure sensor type) detects a submerged condition to power On the onboard components, and detects a non-submerged condi- (Continued)

tion to power Off. The jig body may be monolithically formed or assembled from multiple molded members (mechanically connected).

20 Claims, 13 Drawing Sheets

(56) References Cited

U.S. PATENT DOCUMENTS

2019/0216067 A1\* 7/2019 Naig .................. A01K 85/015
2019/0380321 A1\* 12/2019 Heines .................. A01K 85/16

FOREIGN PATENT DOCUMENTS

| | | | | |
|---|---|---|---|---|
| DE | 102019205734 A1 | * | 10/2019 | ............. A01K 85/16 |
| DE | 102022211477 A1 | * | 6/2023 | ......... A01K 85/1893 |
| KR | 20120028788 A | * | 3/2012 | ......... A01K 85/1893 |
| KR | 20190129516 A | * | 11/2019 | ............. A01K 85/01 |
| KR | 20200024588 A | * | 3/2020 | ........... A01K 85/005 |
| KR | 20250005624 A | * | 1/2025 | ......... G05D 23/1917 |
| WO | WO-2005084431 A1 | * | 9/2005 | ............. A01K 85/01 |
| WO | WO-2014032182 A1 | * | 3/2014 | ............. A01K 99/00 |
| WO | WO-2016187007 A1 | * | 11/2016 | ............. A01K 85/01 |
| WO | WO-2017035329 A1 | * | 3/2017 | ............. A01K 85/01 |

\* cited by examiner

ANIMATED FISHING JIG APPARATUS AND SYSTEM

CROSS-REFERENCE TO RELATED APPLICATIONS

This application claims the benefit under 35 U.S.C. § 119(e) of U.S. Provisional Patent Application Ser. No. 63/542,088 titled ANIMATED FISHING JIG APPARATUS AND SYSTEM filed on Oct. 2, 2023, the entire contents of which are incorporated herein by reference.

FIELD OF THE INVENTION

The present invention relates generally to fishing lure structure and deployment technology. More particularly, this invention pertains to devices, systems, and associated methods for fabricating and operating an animated fishing jig.

BACKGROUND OF THE INVENTION

Jig fishing involves use of a hook with a weighted head to lure fish to bite. The jig fishing technique typically entails manipulating the jig at the end of fishing line to mimic the movement of prey in the water. Known jig designs are commonly made of lead, tungsten, or other heavy metals. The hook may be baited with a soft plastic lure, such as an artificial worm or a minnow, to entice fish to bite. Jig fishing may be employed in both freshwater and saltwater; and can be effective for catching a variety of fish including bass, walleye, crappie, and trout.

Deep drop fishing is a type of fishing conducted in water depths of over two hundred (200) feet, typically done offshore in ocean waters rather than in rivers or lakes. Some of the many different deep drop species of fish that may be caught include snapper, grouper, tilefish, and swordfish. Equipment used to catch fish at such extreme depths may include jigs, bait, and lures. Using weighted line to lower bait into a water column is the most common method for deep dropping fish. Once the bait reaches the desired depth, it may be allowed to drift with the prevailing underwater current.

Fishing at water depths over two hundred (200) feet poses challenges not only for equipping properly for these harsh underwater environments (e.g., prevailing pressure, physical hazards), but also for attracting fish in those environments (e.g., relative darkness, unexpected currents). Known auxiliary features commonly added to deep drop jigs to lure fish, particularly for night fishing, include blades designed to generate vibration and/or marked/colored/glowing exteriors optimized to a target fish's vision. However, determining the right jig size and weight, for the right depth, with the right features to attract the desired type of fish is largely an exercise in experience won through trial-and-error.

Accordingly, a need exists for a solution to the challenge of providing a reliable, effective, and affordable deep drop fishing jig.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a fishing jig apparatus and system that animates using light and/or vibration. Advantageously employable in both freshwater and saltwater, and in both deep-drop style and trolling style fishing, the fishing jig design of the present invention may be configured in various shapes (e.g., elongated, round, oval, knife, spoon) and various sizes (e.g., from 100 grams to 900 grams). The exterior structure of the fishing jig may comprise simulated "bait fish" features, such as artificial eyes that light up and/or blink in different colors; and a body pattern (e.g., fish scales) designed to attract a target fish. Inside the fishing jig is an animator system assembly comprising lights (e.g., light-emitting diodes (LEDs)) configured to produce the artificial eye lighting/blinking effect; and a micro vibration motor configured to project wave pulses through the water environment proximate the jig body. Selective delivery of power from an onboard battery to the lighting and vibration components may be controlled by an environmental sensor switch rated to depths of at least two hundred (200) feet. When the fishing jig assembly is submerged in water, the pressure change (to high) and/or the detection of the presence of water causes the switch to turn On, thus delivering battery power to operate the LEDs and micro vibration motor. When the fishing jig assembly is removed from water, the pressure change (to low) and/or mere removal from the presence of water causes the switch to turn Off, thus stopping power delivery from the battery and, in turn, ceasing animation of the jig assembly using the LEDs and micro vibration motor. Such automatic "water touch" activation advantageously allows the present invention to be used from shallow reefs at 15-200 feet down to the deepest reefs at 900-1500 feet down.

More specifically, in certain embodiments, the present invention may comprise an animated fishing jig apparatus having a jig body characterized by an exterior surface and an interior chamber. A head eye may be mechanically connected to a bow post positioned proximate to a forward portion of the jig body. A tail eye may be mechanically connected to a stern post positioned proximate to an aft portion of the jig body. The exterior surface may be configured to carry one or more eyeball windows. The interior chamber may fittedly receive and carry an animator system assembly comprising one or more light sources, a micro vibration motor, and a battery.

The light source(s) may be of various types and functionalities (e.g., LED, multicolor, flashing), and may be positioned proximate a respective interior side of each eyeball window. These eyeball windows may be constructed of clear or opaque material to allow generated light to propagate into the environment immediately outside the jig body. The micro vibration motor may be sized to fit within the interior chamber (e.g., 6×12 millimeter) and may meet minimum specifications to power desired electronic components onboard the assembly (e.g., DC 1.5V-3V 44000 RPM]. A battery (e.g., rechargeable type, removeable type, or permanent type) may be configured to power the light source(s) and the micro vibration motor during assembly deployment. To power rechargeable type batteries, the exterior surface may have through-mounted to it a charging port. An automatic switch (e.g., water sensor type or pressure sensor type) may, upon detection of a submerged condition, power On electrical communication from the battery to onboard components and, upon detection of a non-submerged condition, to power Off the communication from the battery to onboard components.

The molded jig body may be characterized by a substantially torpedo shape and a substantially round cross section. The exterior surface of the jig body may be adorned with any number of desired fish lure body markings (e.g., stencil type, paint type, infused mold coloring type). The jig body may be monolithically formed or assembled from a plurality of members (e.g., two members each characterized by a respective interior void which, when joined in an assembled state, define the interior chamber). Joining of the two members in the assembled state may further comprise mechanically connecting a tongue substantially circumferential to the interior void of a first of the two members and a groove substantially circumferential to the interior void of a second of the two members. Assembly may further comprise mechanical connection using a machine screw(s) inserted through a respective hole in a first of the two body members and received by a respective female anchor in a second of the two body members.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Throughout this disclosure, the present invention may be referred to as an animated fishing jig system, an animated deep drop jig system, deep drop jig system, an animated deep drop jig, an animated jig, a deep drop jig, a jig, a jig system, a jig assembly, a system, an apparatus, and/or a method for deep drop fishing jig deployment. Embodiments of the invention may include assemblies, systems and methods, including deep drop fishing jig structures and deployment methods, differing in specific detail from the ones illustrated in the figures and examples below, but nonetheless delivering the same functionality for deep drop fishing. Those skilled in the art will appreciate that this terminology is only illustrative and does not affect the scope of the invention.

Figure 1A:
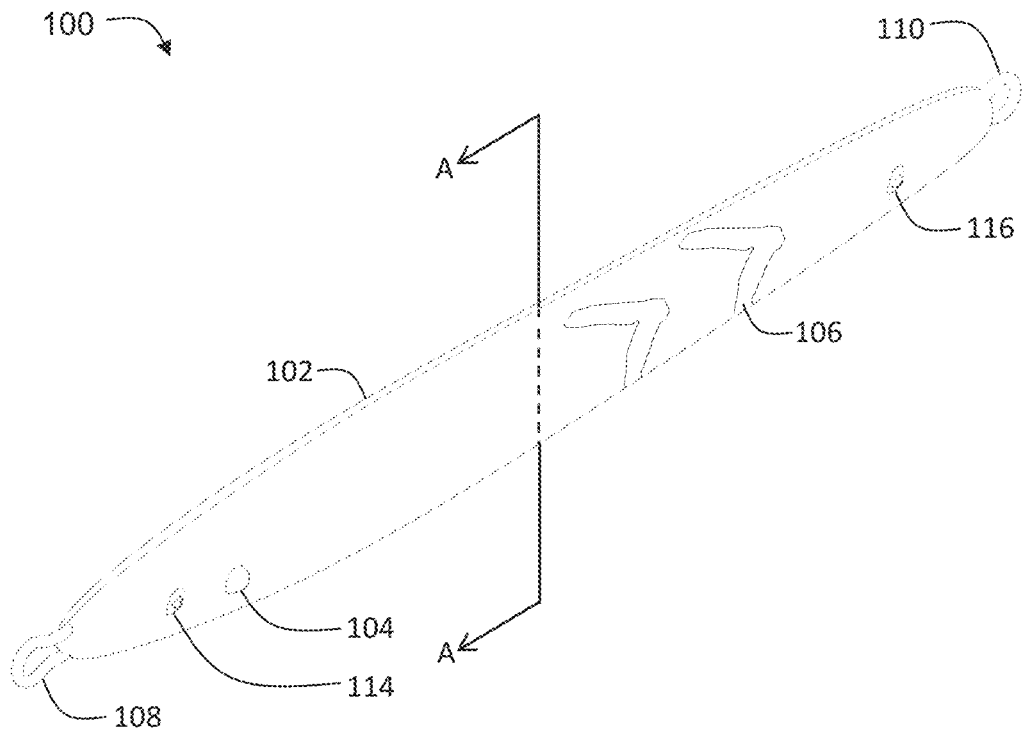
FIG. 1A is a top perspective view of a first exemplary animated deep drop fishing jig apparatus according to an embodiment of the present invention.
Figure 1B:
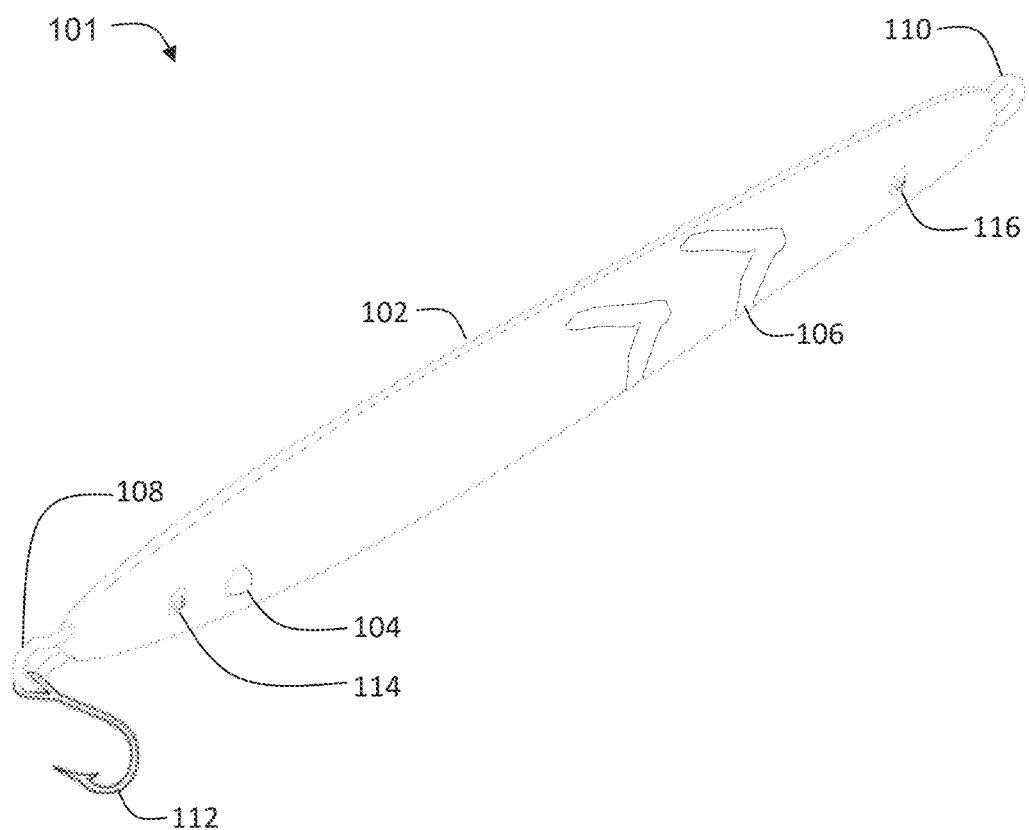
FIG. 1B is an adorned view of the animated deep drop fishing jig apparatus of FIG. 1A.
Figure 1C:
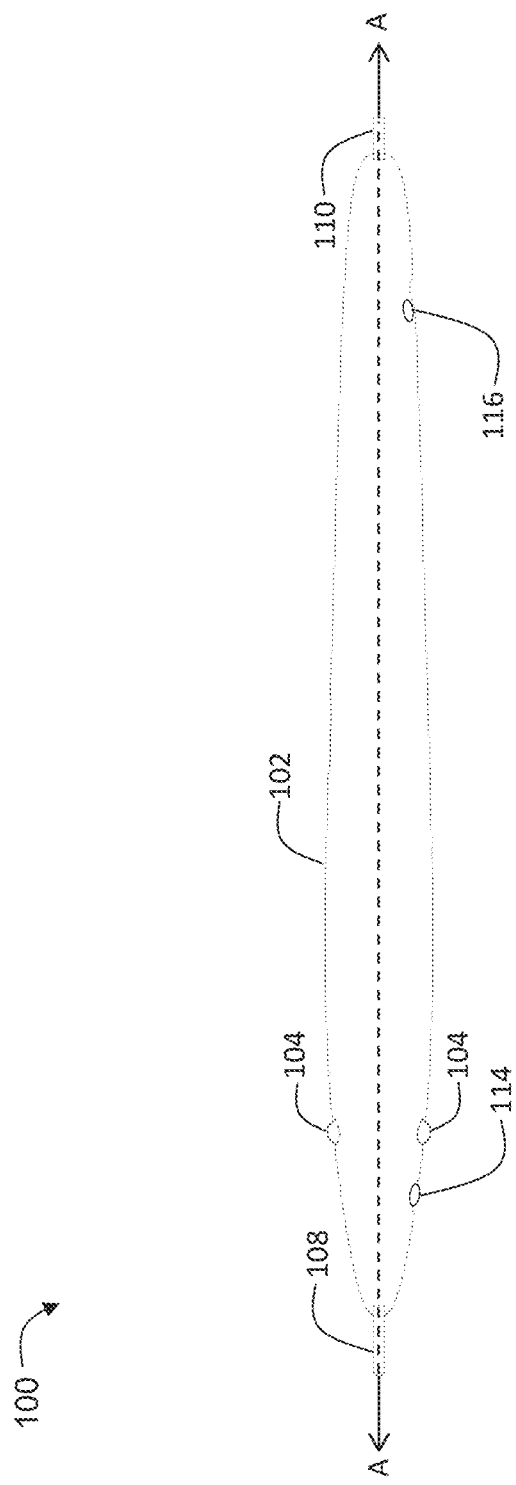
FIG. 1C is a top view of the animated deep drop fishing jig apparatus of FIG. 1A.
Figure 1D:
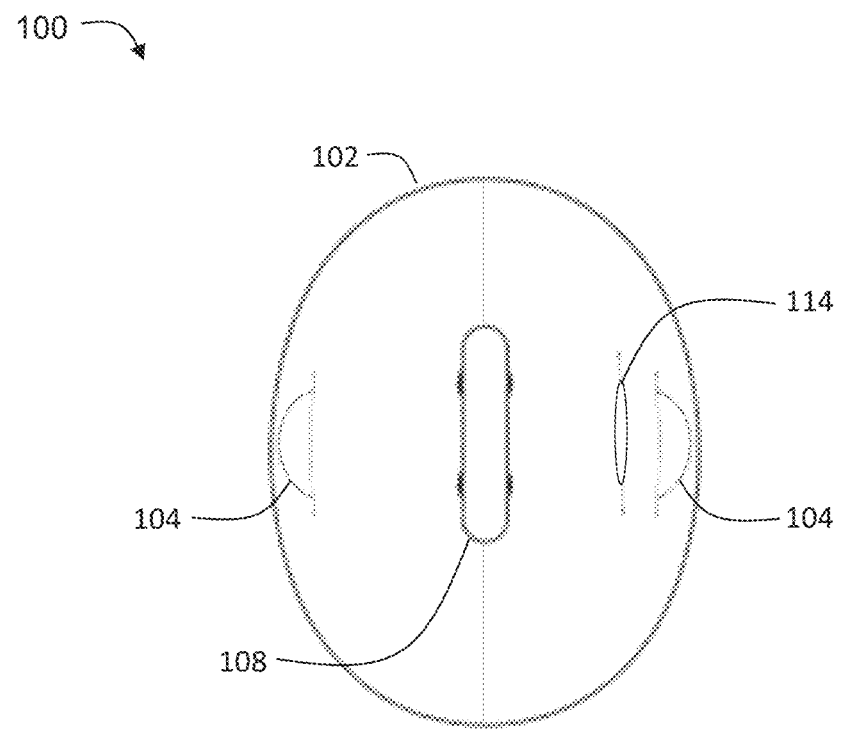
FIG. 1D is a front view of the animated deep drop fishing jig apparatus of FIG. 1A.
Figure 1E:
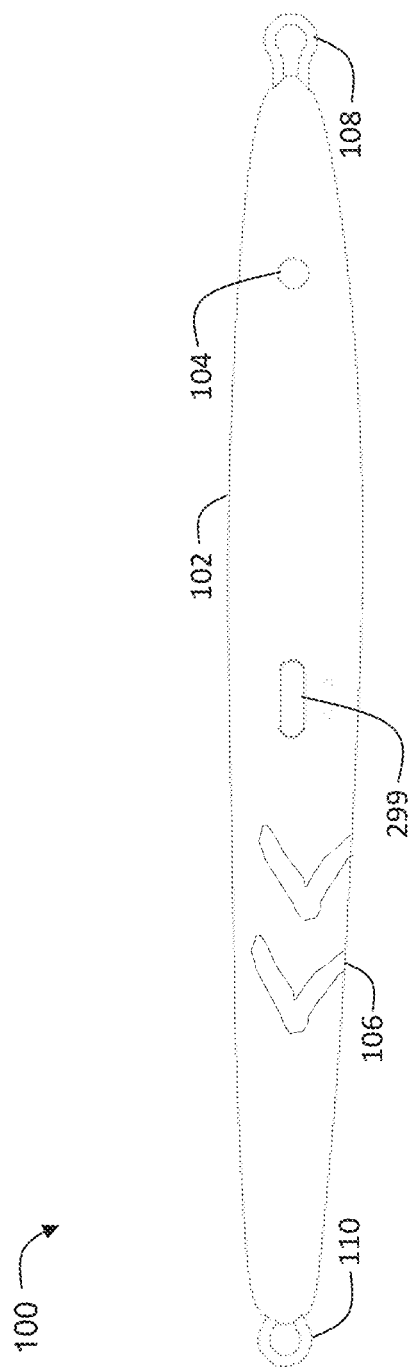
FIG. 1E is a starboard side view of the animated deep drop fishing jig apparatus of FIG. 1A.

Referring initially to FIGS. 1A, 1C, 1D, 1E and 2A, a first exemplary animated deep drop fishing jig apparatus and system 100 according to an embodiment of the present invention will now be described in detail. The animated deep drop fishing jig 100 may comprise a jig body 102 characterized by one of various shapes conducive to deep drop fishing, including "torpedo" style (as shown in FIGS. 1A, 1C and 1E) and generally round in cross section (as shown in FIG. 1D). The jig body 102 may comprise surface features known to lure target fish, such as artificial bait fish features and body markings (e.g., simulated scales). Jig body 102 may comprise a through-mounted eyeball window 104 that may be generally clear or opaque to allow light to pass from a light source (described hereinbelow) that may be positioned inside of the jig body 102, and/or an exterior stencil 106 that may provide desired body markings. In certain embodiments, such body markings may be applied as paint and/or infused as mold coloring rather than, or in addition to, exterior stenciling 106. Referring additionally to adorned jig configuration 101 of FIG. 1B, at the forward portion of the jig body 102 may be a head eye 108 and at the aft portion of the jig body 102 may be a tail eye 110, both configured to mechanically carry a load (e.g., hook(s) 112; fishing line).

Figure 2A:
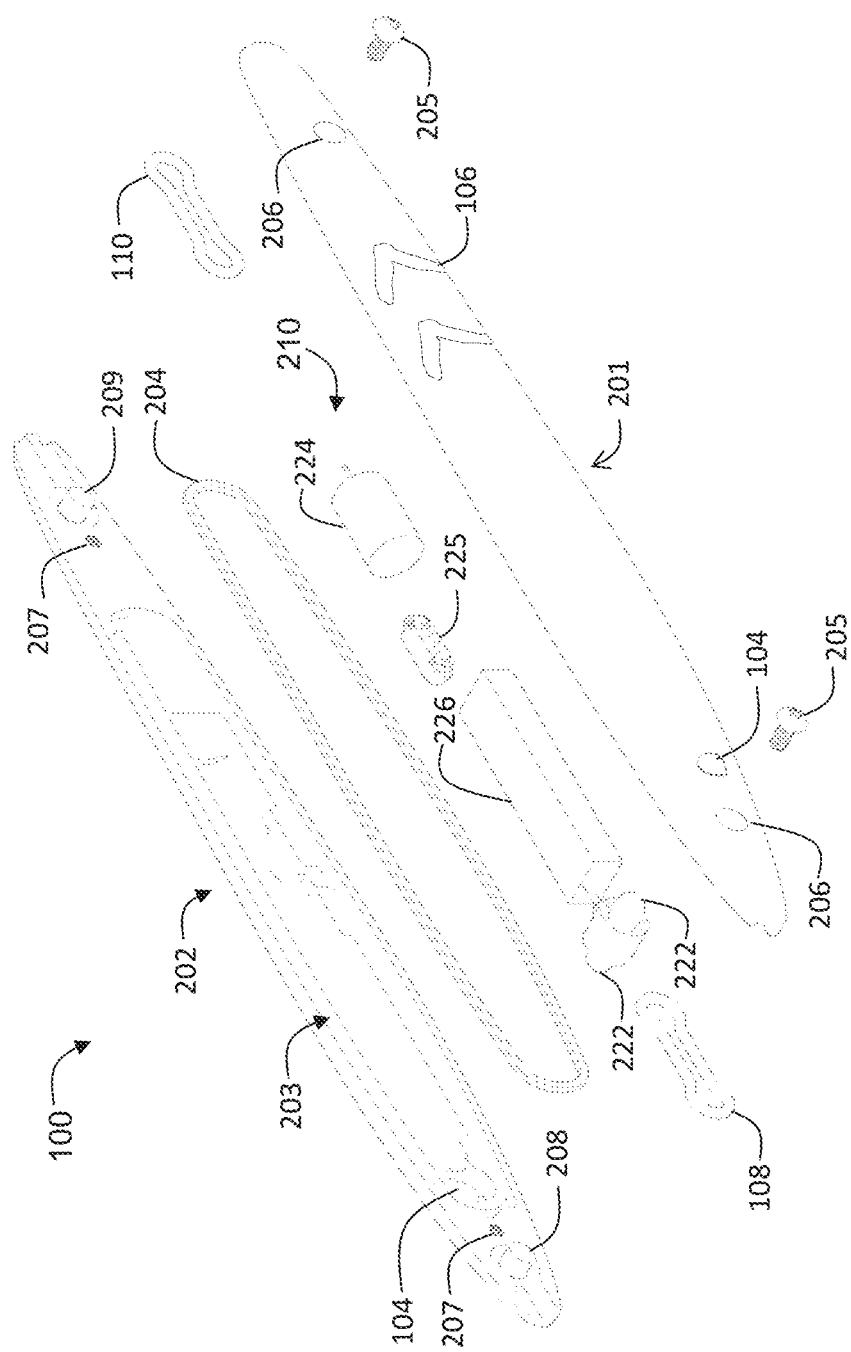
FIG. 2A is an exploded top perspective view of the animated deep drop fishing jig apparatus of FIG. 1A as taken through line A-A of FIG. 1A.
Figure 2B:
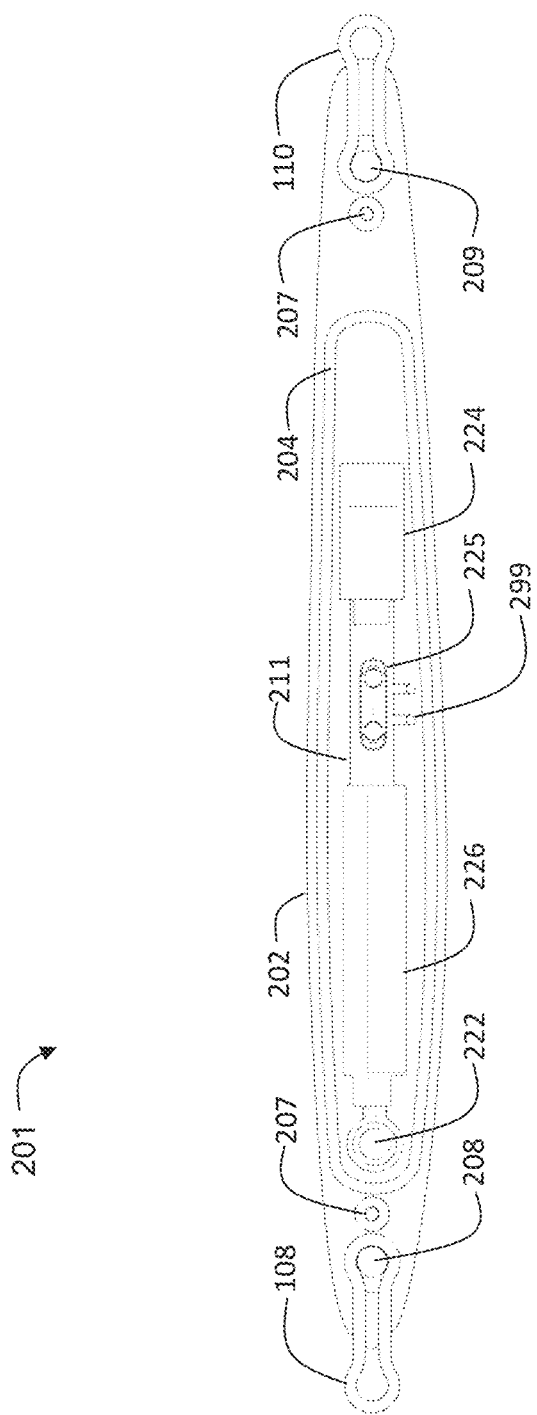
FIG. 2B is an interior side assembled view inclusive of a jig body starboard member of the animated deep drop fishing jig apparatus of FIG. 1A.

Referring now to FIGS. 2A and 2B, and still referring to FIGS. 1A, 1C, 1D and 1E, an exploded view of the animated deep drop fishing jig apparatus and system 100 of FIG. 1A shows the jig body 102 split into substantially longitudinal halves to form a port member 201 and a starboard member 202, each comprising a respective void that combine to form a hollow interior chamber within the jig body 102. In the illustrated embodiment 100 of the present invention, selective physical separation of the jig body 102 into two members 201, 202 along, for example, and without limitation, a joint (such as a tongue and groove 203 that may be augmented with a seal 204, as shown) around the interior chamber may be accomplished using connectors (e.g., machine screws 205 inserted through holes 206 in one body member and received by female anchors 207 formed in an opposite body member). When the jig 100 is assembled 201, the head eye 108 may be fixed internal to the jig body 102 by a bow post 208, and the tail eye 110 may be fixed internal to the jig body 102 by a stern post 209.

Still referring to FIGS. 2A and 2B, an animator system assembly 210 may be configured to fit within the interior chamber of the jig body 102 and to be mechanically carried by the jig body 102. More specifically, the animator system assembly 210 may be carried fittedly and substantially longitudinally coextensive with a length of the interior chamber of the jig body 102. In certain alternative embodiments, fixed positioning of the animator system assembly 210 within the jig body 102 may be supported by mating fixed latches on an interior frame (not shown) to receiving anchors (not shown) within the interior chamber of the jig body 102. The interior chamber also may be molded to receive the assembled shape of the various components of the animator system assembly 210, those components as described hereinbelow.

For example, and without limitation, the animator system assembly 210 may comprise at least one deep drop light emitting diode (LED) 222 and/or a micro vibration motor 224. The LED(s) 222 may be of a multicolor and/or flashing type; and may be fittedly positioned within the interior chamber proximate the port and starboard eyeball windows 104 of jig body 102. The micro vibration motor 224 (e.g., 6×12 millimeter; DC 1.5V-3V 44000 RPM) similarly may be fittedly and fixedly positioned within the interior chamber of the jig body 102. Electrical power may be delivered to the LED(s) 222 and/or to the micro vibration motor 224 along an electrical bus 211 configured in electrical communication with an onboard battery 226 (e.g., 6 centimeters×1 centimeter diameter; 500 mAh; lithium-ion) that may be fittedly and fixedly positioned within the interior chamber of the jig body 102. When power from the battery 226 is delivered along the bus 211 to the LED(s) 222, the LED(s) 222 may operate to project light through the port and starboard eyeball windows 104 to animate the jig apparatus and system 100 with light/color to lure fish to strike. When onboard power from the battery 226 is delivered along the bus 211 to the micro vibration motor 224, the micro vibration motor 224 may operate to translate vigorous vibration through the jig body 102 to animate the jig apparatus and system 100 with vibration to lure fish to strike, In certain embodiments of the present invention, power delivery from the onboard battery 226 to the LED(s) 222 and/or the micro vibration motor 224 may be automatically controlled by a environmental sensor switch 225 (e.g., mechanical pressure, water presence detection). Like the other components of the animator system assembly 210, the switch 225 may be sized to fit securely within the interior chamber of the jig body 102. For example, and without limitation, switch 225 may be mechanically configured in an Off position when the animated deep drop fishing jig apparatus 100, 200 is above water (e.g., a relatively low-pressure environment). When the animated deep drop fishing jig apparatus 100, 200 is submerged underwater (e.g., a relatively high pressure environment), the switch 225 may be mechanically configured to transition to On position and, as a consequence, trigger power delivery from the battery 226 to the LED(s) 222 and/or micro vibration motor 224 to start an animation sequence that may continue while the switch 225 remains On. Removing the jig apparatus 100, 200 from the water (e.g., after retrieving the jig apparatus 100, 200 by pulling in a hooked fish) may expose the jig apparatus 100, 200 to a non-submerged condition again, thus causing the switch 225 to transition back to the Off position and, as a consequence, to stop power delivery from the battery 226, thus disengaging the animation components (i.e., LED(s) 222 and micro vibration motor 224). In certain embodiments of the present invention, the battery 226 may be of a rechargeable type, and the jig body 102 may present access to a charging port 299 for purposes of user-directed recharging of the battery 226. In alternative embodiments of the present invention, configuring the apparatus 100 to selectively disassemble into two members 201, 202 may allow user access to the interior chamber to replace the battery 226, as needed.

Figure 3A:
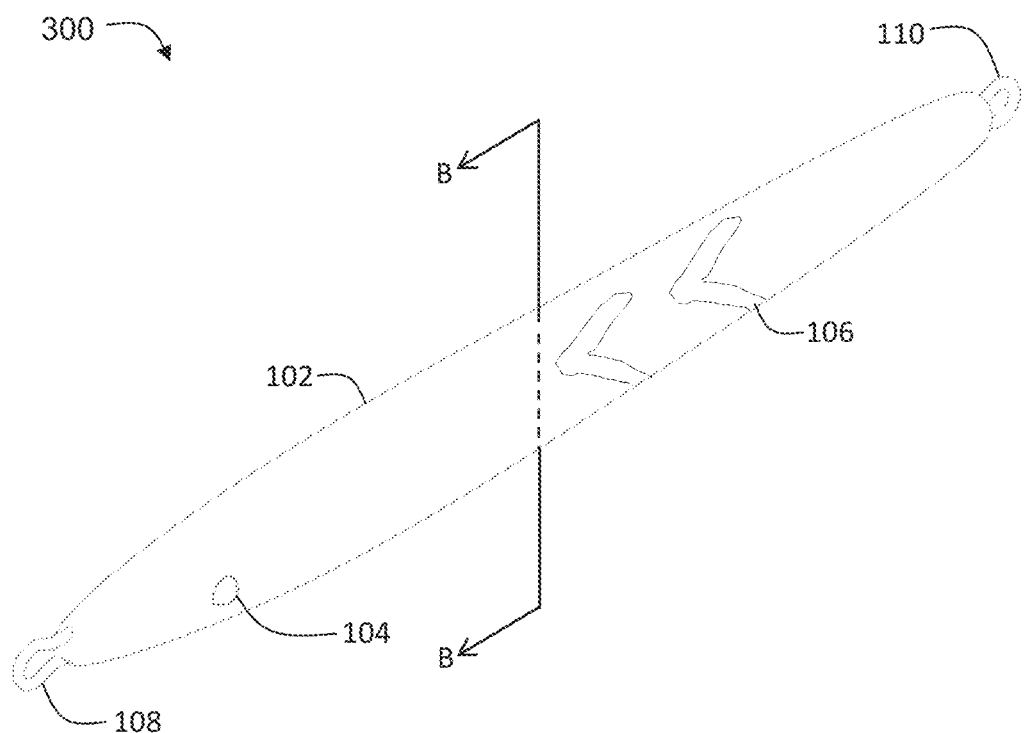
FIG. 3A is a top perspective view of a second exemplary animated deep drop fishing jig apparatus according to an embodiment of the present invention.
Figure 3B:
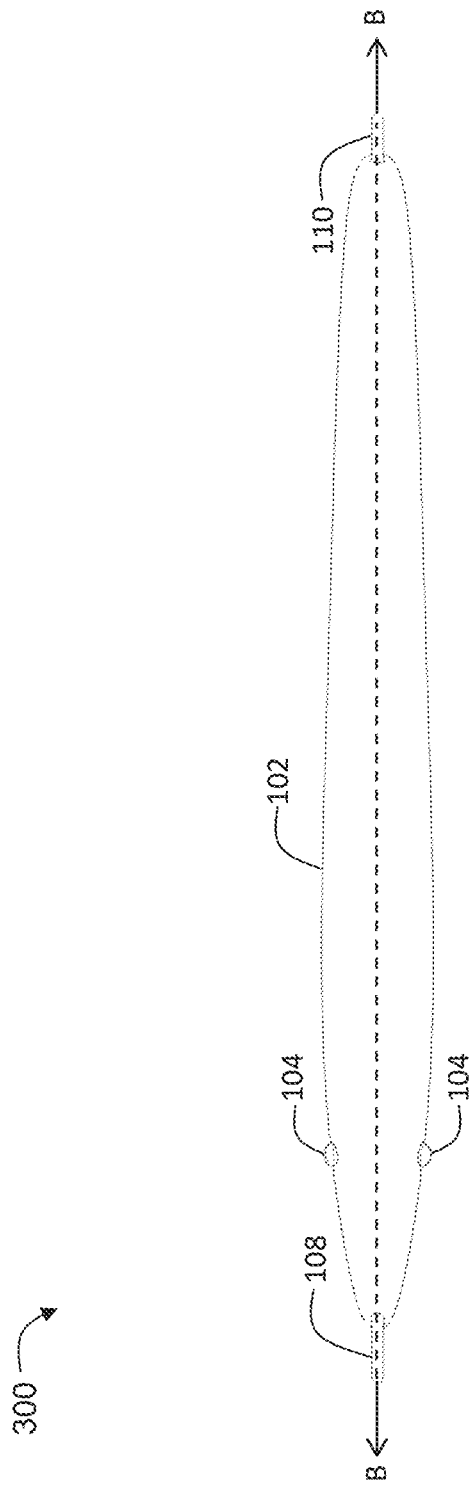
FIG. 3B is a top view of the animated deep drop fishing jig apparatus of FIG. 3A.
Figure 3C:
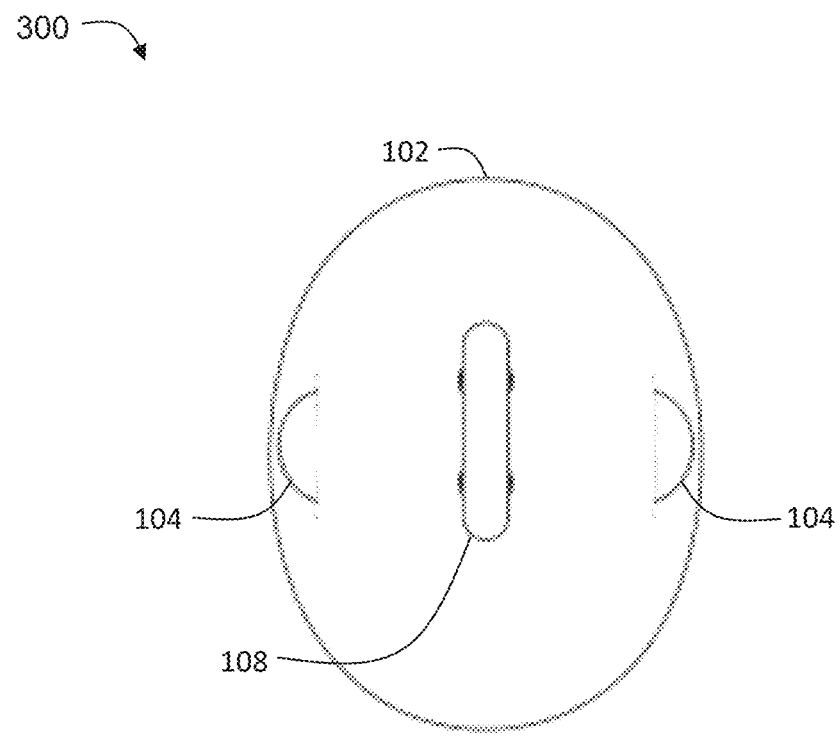
FIG. 3C is a front view of the animated deep drop fishing jig apparatus of FIG. 3A.
Figure 3D:
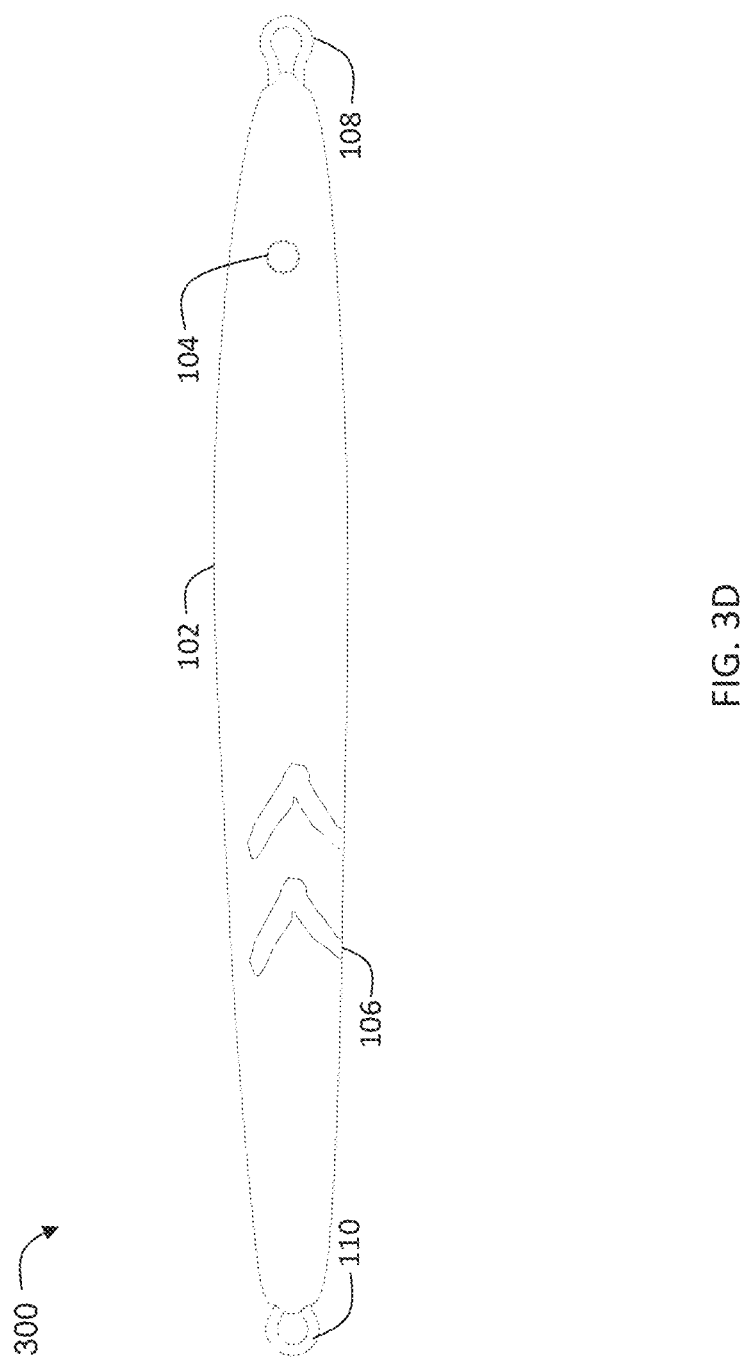
FIG. 3D is a starboard side view of the animated deep drop fishing jig apparatus of FIG. 3A.
Figure 4A:
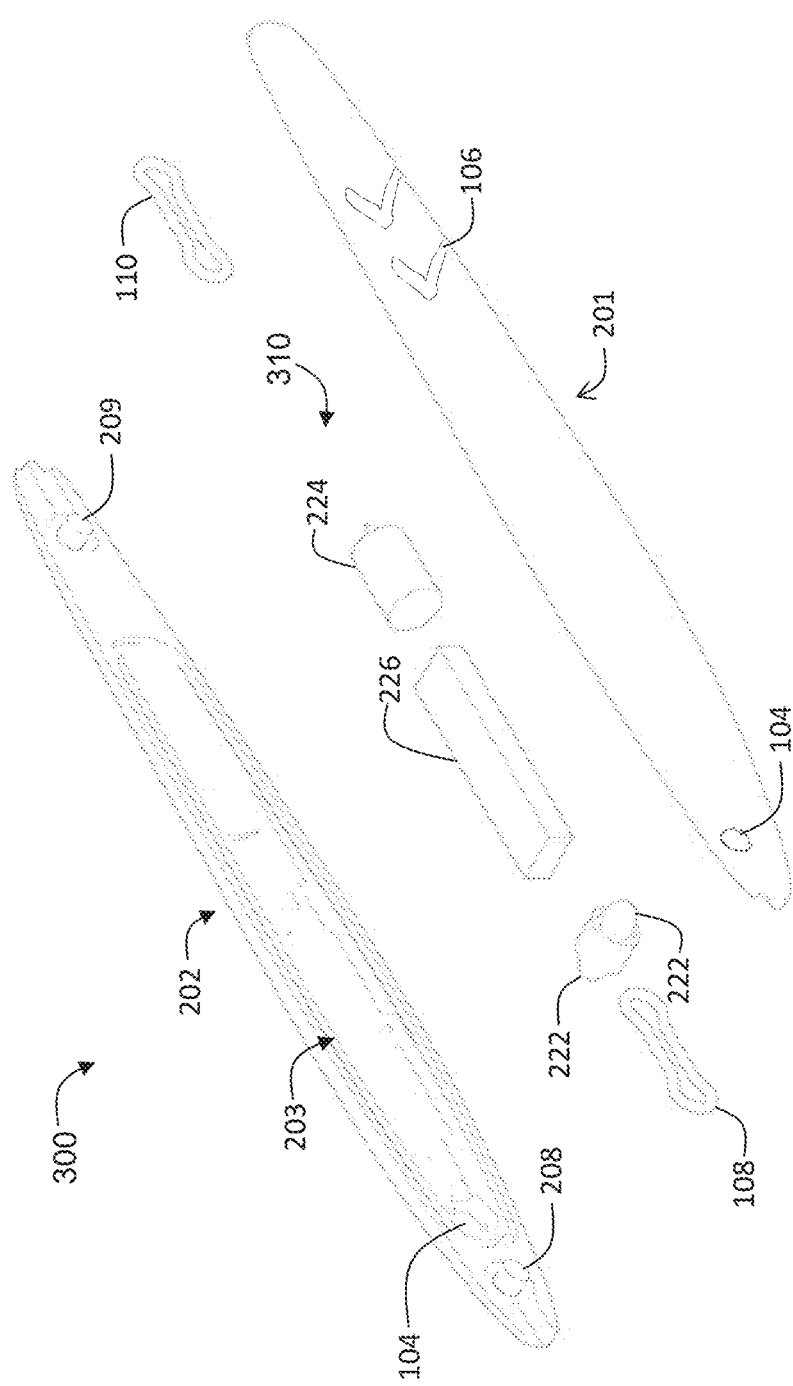
FIG. 4A is an exploded top perspective view of the animated deep drop fishing jig apparatus of FIG. 3A as taken through line B-B of FIG. 3A.
Figure 4B:
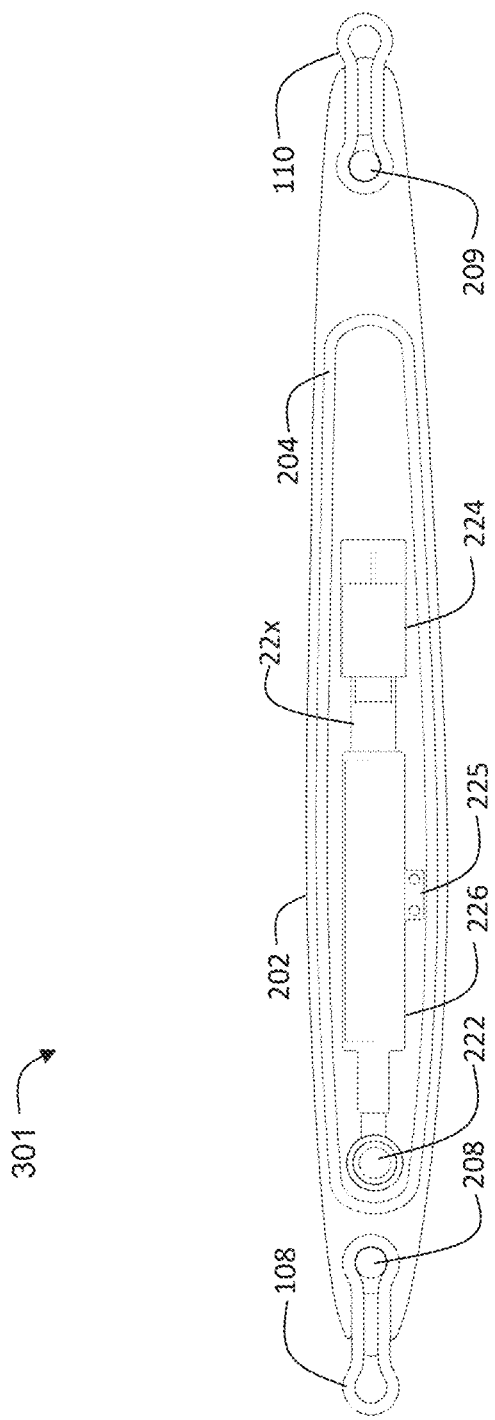
FIG. 4B is an interior side assembled view inclusive of a jig body starboard member of the animated deep drop fishing jig apparatus of FIG. 3A.

Referring now to FIGS. 3A, 3B, 3C, 3D, 4A and 4B, a second exemplary animated deep drop fishing jig apparatus and system 300 according to an embodiment of the present invention will now be described in detail. Although similar in features and configuration to the first exemplary apparatus and system 100 described hereinabove, the jig body 102 of this second exemplary apparatus and system 300 may be monolithically formed (e.g., a solid structure having an interior chamber completely sealed from a harsh deep water environment exterior to the jig body 102). More specifically, a person of skill in the art will immediately recognize that a monolithically formed jig body 102 may not be configured for selective physical separation into two members, thereby eliminating the need for failure-prone connection points (e.g., machine screws 205 inserted through holes 206 in one body member and received by female anchors 207 formed in an opposite body member). Also, a person of skill in the art will immediately recognize that monolithic configuration may defeat use of replaceable batteries. Although a charging port 299 may be supported in a monolithic configuration for purposes of user-directed recharging of the battery 226, the second exemplary assembly and system 300 of FIGS. 3D, 4A and 4B illustrate configuration with a permanent battery 226 (i.e., not replaceable, nor rechargeable via a charging port 299). A less expensive option than rechargeable batteries, the permanent battery 226 may have a typical lifespan of approximately one year under normal use of an animated deep drop fishing jig apparatus and system of the present invention.

Certain embodiments of the present invention may employ auxiliary components designed to achieve waterproofing of the interior chamber of the jig body 102. For example, and without limitation, a waterproof capsule (not shown) sized to insert inside the interior chamber of the jig body 102 may be configured to fittedly receive the animator system assembly 210, 310 and to protect the assembly 210, 310 from water intrusion and/or handling damage. In such an embodiment, the capsule components may be clear or generally opaque to allow visual inspection of the positioning and/or condition of the animator system assembly 210, 310.

Certain embodiments of the present invention may feature alternative configurations for selective separation of the jig body 102 into two members that may be reassembled. For example, and without limitation, selective physical separation of the jig body 102 into two members may be implemented cross-sectionally along a threaded female join (not shown) in a forward member and a threaded male join (not shown) in the aft member that together may employ sealing means (e.g., O-ring) when assembled to prevent water intrusion into the interior chamber of the jig body 102.

Certain embodiments of the present invention that feature jig body 102 designs that disassemble may support selective configuration of interchangeable animated deep drop fishing jig apparatus and system solutions. For example, and without limitation, custom combinations of eyeball window 104 color, jig body structure and markings, vibration intensity and pattern, and/or heal and tail eye 108, 110 adornments may be advantageously achieved simply by disassembling a desired jig body 102, inserting a desired animator system assembly (with or without the protection of capsule components), and reassembling the jig body 102 members to reestablish a watertight seal.

Also as an alternative design, the animation sequence of the animator system assembly 210, 310 may be triggered manually by depression of an On/Off button (not shown), instead of, or in addition to, by the environmental switch 225 operation. Watertight access to the On/Off button may be supported by a sealed button cover present on the exterior of the jig body 102. Also as an alternative design, sealable access to a charging receptacle 299 may be supported by a plugged charging port (not shown) present on the exterior of the jig body 102.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. An animated fishing jig apparatus comprising:
   a jig body characterized by an exterior surface and an interior chamber;
   a head eye mechanically connected to a forward portion of the jig body;
   a tail eye mechanically connected to an aft portion of the jig body;
   wherein the exterior surface is configured to carry at least one eyeball window; and
   wherein the interior chamber is configured to carry an animator system assembly comprising:
      at least one light source positioned proximate a respective interior side of each of the at least one eyeball window,
      a micro vibration motor,
      a battery configured in electrical communication with at least one of the at least one light source and the micro vibration motor, and
      an automatic switch configured:
         upon detection of a submerged condition, to power On the electrical communication, and
         upon detection of a non-submerged condition, to power Off the electrical communication.

2. The animated fishing jig apparatus according to claim 1, wherein the jig body is characterized by at least one of a substantially torpedo shape and a substantially round cross section.

3. The animated fishing jig apparatus according to claim 1, wherein the exterior surface of the jig body is adorned with a fish lure body marking of an application type selected from the group consisting of a stencil type, a paint type, and an infused mold coloring type.

4. The animated fishing jig apparatus according to claim 1, wherein the at least one light source is of a light emitting diode (LED) type.

5. The animated fishing jig apparatus according to claim 1, wherein the interior chamber is configured to fittedly receive the animator system assembly.

6. The animated fishing jig apparatus according to claim 1, wherein the jig body is of one of a monolithic type and an assembly type.

7. The animated fishing jig apparatus according to claim 1, wherein the automatic switch is of one of a water sensor type and a pressure sensor type.

8. The animated fishing jig apparatus according to claim 1, wherein the battery is of one of a rechargeable type, a removeable type, and a permanent type.

9. The animated fishing jig apparatus according to claim 8, wherein the battery is further of the rechargeable type; and wherein the exterior surface is further configured to carry a charging port.

10. An animator system assembly configured to operate an animated fishing jig apparatus comprising:
    a jig body characterized by an exterior surface configured to carry at least one eyeball window and an interior chamber configured to carry the animator system assembly,
    a head eye mechanically connected to a forward portion of the jig body, and
    a tail eye mechanically connected to an aft portion of the jig body;

the animator system assembly comprising:
- at least one light source positioned proximate a respective interior side of each of the at least one eyeball window,
- a micro vibration motor,
- a battery configured in electrical communication with at least one of the at least one light source and the micro vibration motor, and
- an automatic switch configured,
  - upon detection of a submerged condition, to power On the electrical communication, and
  - upon detection of a non-submerged condition, to power Off the electrical communication.

11. The animator system assembly according to claim 10, wherein the at least one light source is of a light emitting diode (LED) type.

12. The animator system assembly according to claim 10, wherein the interior chamber is configured to fittedly receive the animator system assembly.

13. The animator system assembly according to claim 10, wherein the automatic switch is of one of a water sensor type and a pressure sensor type.

14. The animator system assembly according to claim 10, wherein the battery is of one of a rechargeable type, a removeable type, and a permanent type.

15. The animator system assembly to claim 14, wherein the battery is further of the rechargeable type; and further comprising a charging port configured in electrical communication with the battery.

16. A method of manufacturing an animated fishing jig apparatus to operate with an animator system assembly comprising:
- at least one light source,
- a micro vibration motor,
- a battery configured in electrical communication with at least one of the at least one light source and the micro vibration motor, and
- an automatic switch configured:
  - upon detection of a submerged condition, to power On the electrical communication, and
  - upon detection of a non-submerged condition, to power Off the electrical communication;

the method comprising the steps of:
- molding a jig body characterized by an exterior surface and an interior chamber;
- mechanically connecting a head eye to a bow post positioned proximate a forward portion of the jig body;
- mechanically connecting a tail eye to a stern post positioned proximate an aft portion of the jig body;
- through-mounting at least one eyeball window onto the exterior surface of the jig body; and
- fittedly receiving the animator system assembly within the interior chamber of the jig body, wherein the at least one light source is positioned proximate a respective interior side of each of the at least one eyeball window.

17. The method of manufacturing according to claim 16, further comprising the step of molding the jig body characterized by at least one of a substantially torpedo shape and a substantially round cross section.

18. The method of manufacturing according to claim 16, wherein the molding the jig body further comprises molding two members each characterized by a respective interior void, wherein the interior chamber is defined by a joining of the respective interior void of each of the two members in an assembled state.

19. The method of manufacturing according to claim 18, wherein the joining of the respective interior void of each of the two members in the assembled state further comprises mechanically connecting a tongue positioned substantially circumferential to the respective interior void of a first of the two members and a groove substantially circumferential to the respective interior void of a second of the two members.

20. The method of manufacturing according to claim 16, wherein the battery is further of the rechargeable type; and further comprising the step of through-mounting a charging port onto the exterior surface of the jig body.

\* \* \* \* \*